United States Patent

Baleh

Patent Number: 6,141,001
Date of Patent: Oct. 31, 2000

[54] METHOD OF SYNCHRONIZING THE PRESENTATION OF STATIC AND DYNAMIC COMPONENTS OF AN INTERACTIVE MULTIMEDIA DOCUMENT

[75] Inventor: Farid Baleh, Gif sur Yvette, France

[73] Assignee: Alcatel, Paris, France

[21] Appl. No.: 08/915,113

[22] Filed: Aug. 20, 1997

[30] Foreign Application Priority Data

Aug. 21, 1996 [FR] France .................. 96 10336

[51] Int. Cl.⁷ .................. G06F 17/30
[52] U.S. Cl. .................. 345/302; 707/102; 707/104; 707/501; 345/328
[58] Field of Search .................. 345/302, 335, 345/333, 330, 328; 707/102–104, 501, 513–515; 717/1–2; 709/102–104, 209

[56] References Cited

U.S. PATENT DOCUMENTS

| | | | |
|---|---|---|---|
| 5,515,490 | 5/1996 | Buchanan et al. | 345/302 |
| 5,586,235 | 12/1996 | Kauffman | 707/500 |
| 5,642,171 | 6/1997 | Baumgartner et al. | 345/302 |
| 5,664,227 | 9/1997 | Mauldin et al. | 707/516 |
| 5,717,438 | 2/1998 | Kim et al. | 345/302 |

OTHER PUBLICATIONS

Takeshi Yoneda et al., "constructing a system using time dependent Multimedia document", Proceedings of the annual international phoenix conference on compputers and communications, Scottsdale, Apr. 1–3, 1992, No. conf.11, Apr. 1, 1992, Institute of elect.

Thuy–Linh Nguyen et al., "object oriented modeling of multimedia documents", computer networks and ISDN systems vol. 30, Issue: 1–7, Apr. 1998, pp. 578–582.

Chi et al., MOCS:an object oriented programming model for multimedia object communication and synchronization, Proceedings of the international conference on distributed computing systems, poznan, poland, Jun. 21–24, 1994, No. conf.14, Jun. 1994, IEEE, pp.

C–L Fung et al, Mocs: An Object–Oriented Programming Model for Multimedia Object Communication and Synchronization, Proceedings of the International Conference on Distributed Computing Systems, Poznan, Poland, Jun. 21–24, 1994, No. Conf. 14, Jun. 1994, Institute of Electronics & Electrical Engineers, pp. 494–501.

Takeshi Yoneda et al, "Constructing a System Using Time Dependent Multimedia Document", Proceedings of the Annual International Phoenix Conference on Compputers and Communications, Scottsdale, Apr. 1–3, 1992, No. Conf. 11, Apr. 1992, Institute of Electrical & Electrical Engineers, pp. 140–147.

G. Blakowski et al, "Tool Support for the Synchronization and Presentation of Distributed Multimedia" Computer Communications, vol. 15, No. 10, Dec. 1, 1992, pp. 611–618.

*Primary Examiner*—John Breene
*Assistant Examiner*—Srirama Channavajjala
*Attorney, Agent, or Firm*—Sughrue, Mion, Zinn, Macpeak & Seas, PLLC

[57] ABSTRACT

In a method for synchronizing the presentation of static and dynamic components of an interactive multimedia document, the document and its dynamic and static components are defined in the system by means of objects. Synchronization data is provided in each object relating to times of presentation in a logical temporal frame of reference derived from a coded temporal frame of reference. In the object corresponding to the multimedia document and in each object corresponding to a static component, synchronization data is provided relating to a time of presentation in a physical temporal frame of reference. In the object corresponding to a dynamic component, synchronization data is provided relating to times of presentation in the coded temporal frame of reference. The synchronization data is processed on each change of speed of presentation of the multimedia document to coordinate the presentation of the components of a dynamic nature and the components of a static nature of the latter.

4 Claims, 3 Drawing Sheets

METHOD OF SYNCHRONIZING THE PRESENTATION OF STATIC AND DYNAMIC COMPONENTS OF AN INTERACTIVE MULTIMEDIA DOCUMENT

BACKGROUND OF THE INVENTION

1. Field of the Invention

The invention concerns a method of synchronizing the presentation of components of a dynamic nature and components of a static nature of an interactive multimedia document in a system for presentation of such documents.

It applies in particular to a system for presentation of interactive multimedia documents used in a hospital environment to construct and to use an interactive document base of surgical records or actions.

2. Description of the Prior Art

Multimedia documents utilize information of different kinds: animated video sequences, sound, text, graphic images, fixed video images, etc.

From a temporal point of view, the information can be classified into two categories:

information of a dynamic nature, the presentation of which is naturally associated with a display time; this is the case with animated video and with sound. The information is generally stored on physical media (video server, audio server, video disk, magnetic tape, etc) with a coded timebase or "time code". For example, recording animated video on a video disk implies conjointly storing an image number with each of the fixed images that constitutes it (on the base of 25 images per second in the case of European video standards);

information of a static nature, the presentation of which is not fundamentally associated with a display time; this is the case with text, with graphic images and with fixed video images. This information is stored on physical media with no associated timebase.

In a multimedia document, information of a static nature can be presented at the same time as other information of a dynamic nature. When the multimedia document is interactive, i.e. when it is possible for the user to change the speed of presentation of the document, the problem is to be able to coordinate the presentation of these various components, especially when the user changes the speed of presentation of the multimedia document.

Under the future MHEG standard (Multimedia and Hypermedia Expert Group—ISO/IEC DIS 13522-1), a multimedia document must be represented in a system for presentation of interactive multimedia documents in accordance with an object-oriented model.

The aim of the invention is to propose a method compatible with the future MHEG standard for synchronizing presentation of components of a dynamic nature and components of a static nature of interactive multimedia documents in a system for presentation of such documents in order to obtain harmonious temporal behavior of the components of a dynamic nature and of a static nature when the user interacts with the presentation system to modify the speed of presentation of the multimedia document.

Another aim of the invention is to propose a method of this kind that is simple to implement in object-oriented programming.

SUMMARY OF THE INVENTION

To this end, the invention consists in a method of synchronizing the presentation of components of a dynamic nature and components of a static nature of an interactive multimedia document in a system for presentation of such documents, including the following steps:

representing the document and its dynamic and static components in the interactive multimedia document presentation system using an object-oriented model to define the interactive multimedia document in the form of a root multimedia object, each component of a dynamic nature of the document in the form of a dynamic monomedia object and each component of a static nature of the document in the form of a static monomedia object, providing in the root multimedia object and in each dynamic or static monomedia object synchronization data relating to times of presentation of the document in a logical temporal frame of reference for a certain speed of presentation of the multimedia document, the logical temporal frame of reference being derived from a coded temporal frame of reference supplied by a storage medium for components of a dynamic nature of the document, providing in the root multimedia object and in each static monomedia object synchronization data relating to a time of change of speed of presentation of the document in the logical temporal frame of reference, supplying in the root multimedia object and in each static monomedia object synchronization data relating to a time of presentation of the document in a physical temporal frame of reference supplied by a clock, supplying in the root multimedia object and in each static monomedia object synchronization data relating to a time of change of speed of presentation of the document in the physical temporal frame of reference, supplying in each dynamic monomedia object synchronization data relating to times of presentation of the document in the coded temporal frame of reference, and processing the synchronization data on each change of speed of presentation of the multimedia document to coordinate the presentation of the components of a dynamic nature and the components of a static nature thereof.

One embodiment of the method of the invention is described in more detail hereinafter with reference to the drawing.

DETAILED DESCRIPTION OF THE PREFERRED EMBODIMENT

Figure 1:
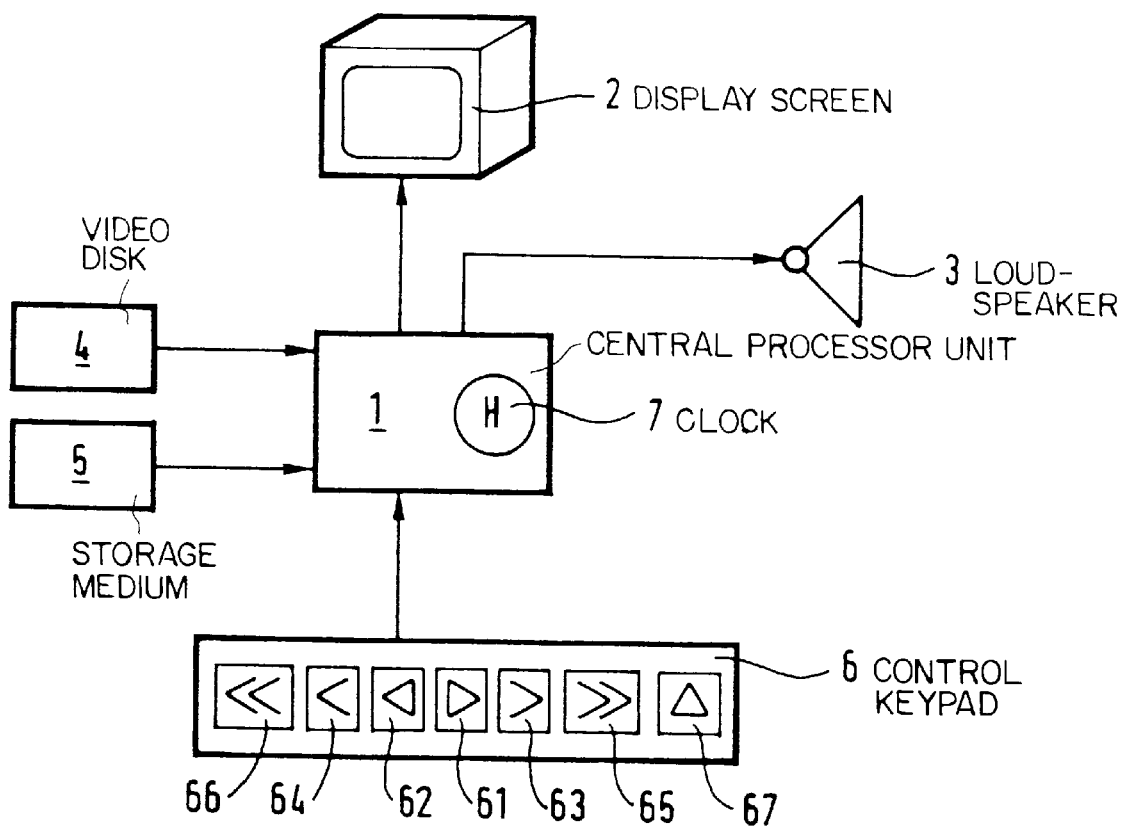
FIG. 1 is a schematic showing a system for presentation of multimedia documents for implementing the method.

In FIG. 1, a system for presentation of an interactive multimedia document shown in a highly schematic manner conventionally comprises a central processor unit 1 connected to a display screen 2 for output of visual information (animated or fixed video images, text, graphics, etc) and a loudspeaker 3 for output of sound information.

In the context of the invention, the multimedia document contains information of a dynamic nature and information of a static nature that can be presented simultaneously. The visual or sound information of a dynamic nature is stored on a recording medium with a coded timebase, in this example on a video disk 4, while the information of a static nature, such as a fixed image or text, is stored on another medium with no coded timebase, for example in the backing store of the central processor unit 1 or on any other similar medium 5.

The central processor unit 1 is also connected to a control keypad 6 enabling the user of the system to control the presentation of the multimedia document using a series of function keys, such as:

- keys 61 and 62 for respectively scrolling forwards and backwards at a normal speed of 25 images per second,
- keys 63 and 64 for respectively scrolling forwards and backwards at a speed lower than 25 images per second,
- keys 65 and 66 for respectively scrolling forwards and backwards at a speed greater than 25 images per second, and
- a pause key 67 for stopping the presentation.

Application of a system for presentation of an interactive multimedia document in accordance with the future MHEG standard is based on an object-oriented approach to the description of the structure of the multimedia document and on a multimedia software engine which, on the basis of this object-oriented presentation, is responsible for recovering the various components of the document from their respective storage media and for presenting each component to the user of the system via the peripheral devices 2 and 3.

Figure 2:
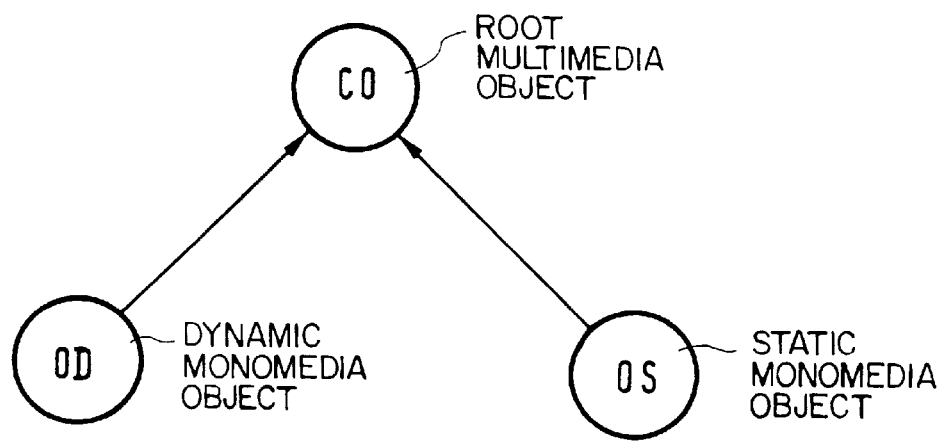
FIG. 2 shows the object-oriented representation of a document in the system on the basis of a simple example of a multimedia document having one component of a static nature and one component of a dynamic nature.

Referring to FIG. 2, in the context of the method in accordance with the invention, the multimedia document is represented in the presentation system 1 in accordance with an object-oriented model to define the multimedia document in the form of a first object called the root multimedia object CO, each component of a dynamic nature of the document in the form of a second object OD called the dynamic monomedia object and each component of a static nature of the document in the form of a third object OS called the static monomedia object.

In FIG. 2, the multimedia document used as an example and shown in accordance with the object-oriented model is relatively simple since it includes only one component of a dynamic nature, for example an audiovisual sequence, corresponding to the object OD and only one component of a static nature, for example a text, corresponding to the object OS. It is obvious that the invention applies to much more complex interactive multimedia documents including a plurality of components of a dynamic or static nature.

Figure 3:
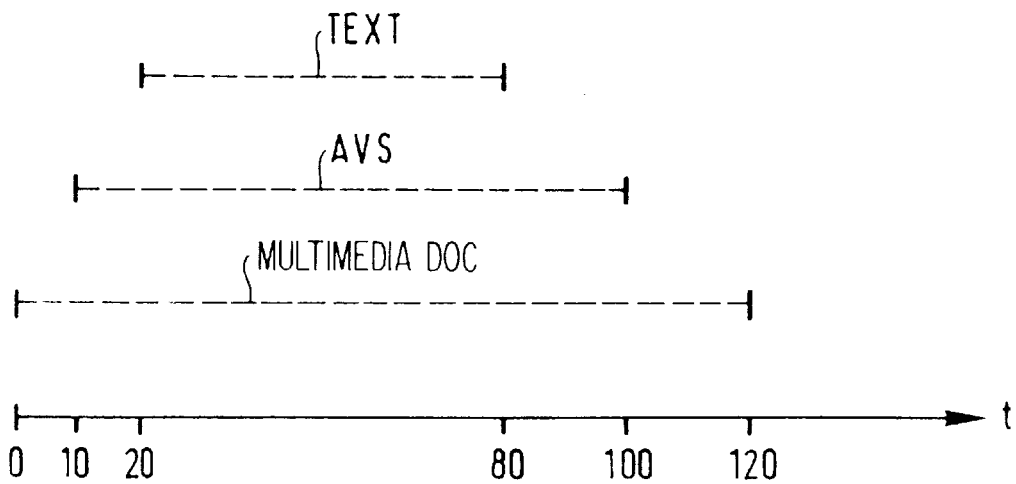
FIG. 3 shows the scenario of the document from FIG. 2.

In FIG. 3, the scenario of the multimedia document used as an example is shown with a timebase based on a unit of one second. This figure shows that the presentation of the multimedia document begins at the origin 0 of the time axis and ends after a period of 120 seconds, for example. The presentation of the audiovisual sequence component AVS starts at the time t of 10 seconds and ends at the time t of 100 seconds, for example. The presentation of the text component TEXT begins at the time t of 20 seconds and ends at the time t of 80 seconds. It is assumed that the audiovisual sequence AVS is stored on the video disk 4 of the system from FIG. 1. It begins with a first image the number of which is 7000 and ends with an image the number of which is 9250. The duration of this audiovisual sequence is therefore 2250 images, i.e. 90 seconds at 25 images per second. These image numbers, which are supplied by the storage medium for the sequence AVS, define the coded temporal frame of reference.

Figure 4:
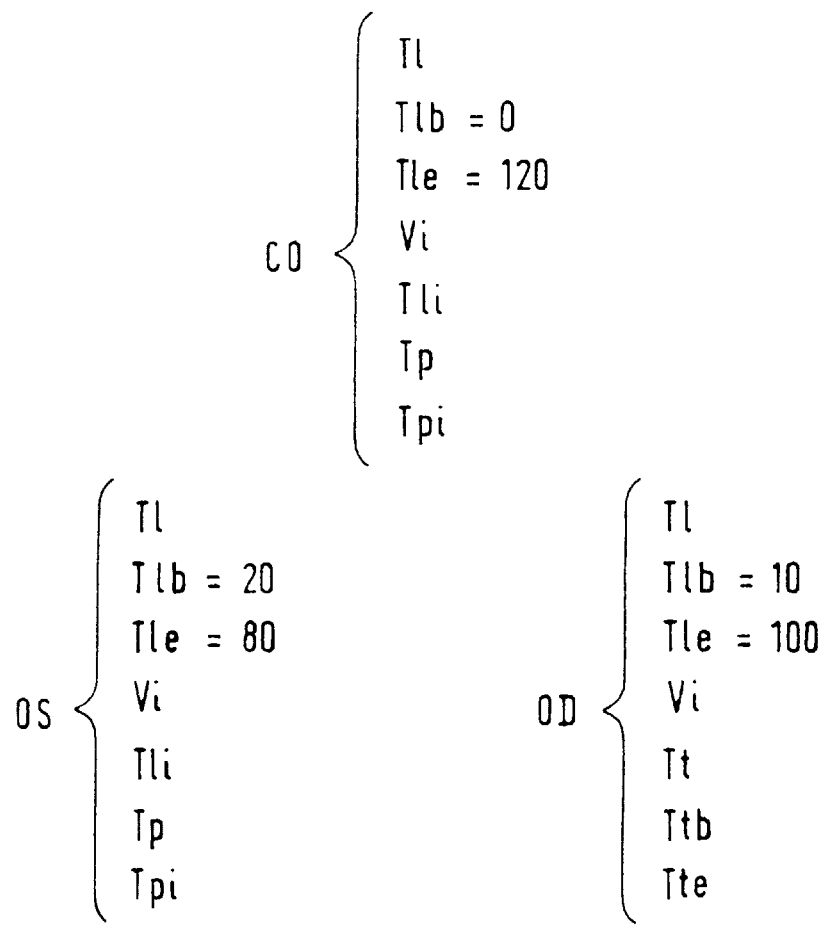
FIG. 4 shows the synchronization data present in the object.

Referring to FIG. 4, synchronization data corresponding to object attributes is provided for the multimedia object and for each monomedia object. The basic idea of the invention is to use this synchronization data to define a logical temporal frame of reference common to the root multimedia object and to the static or dynamic monomedia objects so as to be able to coordinate the presentation of the information of a dynamic nature and the information of a static nature on changing the speed of presentation of the multimedia document.

This figure shows that the object CO and the objects OD and OS have common synchronization data Tl, Tlb, Tle and Vi.

Tl relates to a current presentation time in the logical frame of reference—current time of presentation of the multimedia document for the object CO—current time of presentation of the component AVS for the object OD—current time of presentation of the component TEXT for the object OS;

Tlb relates to a beginning of presentation time in the logical frame of reference—begin presentation time for the object CO of the multimedia document—begin presentation time for the object OD of the component AVS—begin presentation time for the object OS of the component TEXT;

Tle relates to an end of presentation time in the logical frame of reference—end presentation time for the object CO of the multimedia document—end presentation time for the object OD of the component AVS—end presentation time for the object OS of the component TEXT;

Vi relates to the current speed of presentation in the logical temporal frame of reference—current speed of presentation for the object CO of the multimedia document—current speed of presentation for the object OD of the component AVS—current speed of presentation for the object OS of the component TEXT (normally equal to 25 images per second).

In the FIG. 3 example, Tlb(CO) is equal to 0 and Tle(CO) is equal to 120. Then, Tlb(OS) is equal to 20 and Tle(OS) is equal to 80. Finally, Tlb(OD) is equal to 10 and Tle(OD) is equal to 100. This synchronization data remains fixed during the presentation of the multimedia document.

The multimedia object CO and the static object OS have synchronization data Tli relating to a time of change of speed of presentation in the logical temporal frame of reference, synchronization data Tp relating to a current time of presentation in another temporal frame of reference called the physical temporal frame of reference time of presentation for the object CO of the multimedia document—time of presentation for the object OS of the component TEXT, and synchronization data Tpi relating to a time of change of speed of presentation in the physical temporal frame of reference—time of change of speed of presentation for the object CO of the multimedia document—time of change of speed of presentation for the object OS of the component TEXT.

The physical temporal frame of reference is supplied by a clock 7 shown in FIG. 1. This is the internal clock of the central processor unit 1.

Finally, the object OD has synchronization data Tt, Ttb and Tte relating to times of presentation of the component AVS of a dynamic nature in the coded temporal frame of reference.

Tt relates to a current time of presentation of the component AVS in this coded temporal frame of reference;

Ttb relates to a begin presentation time of the component AVS in this coded temporal frame of reference; and Tte relates to an end presentation time of the component AVS in this coded temporal frame of reference.

For the sequence AVS used as an example Ttb(OD) is equal to 7000 and Tte(OD) is equal to 9250. This synchronization data remains fixed throughout the presentation of the document.

Figure 5:
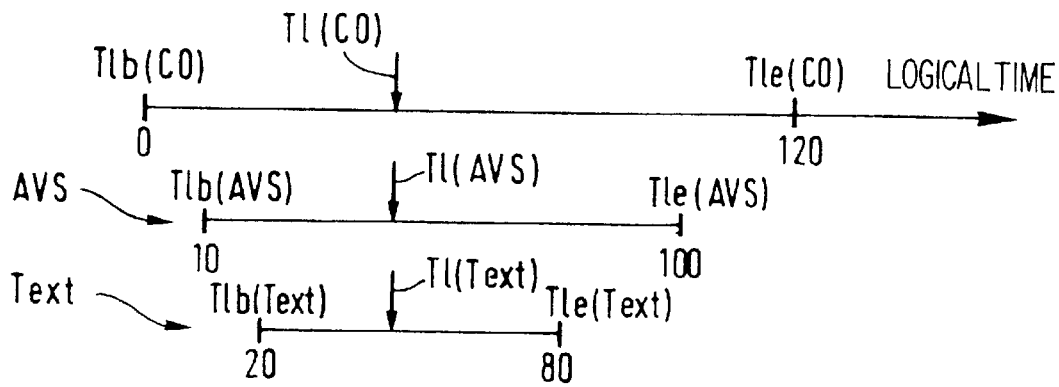
FIG. 5 shows the objects from FIG. 4 in the logical temporal frame of reference.

FIG. 5 is a representation of the objects CO, OD and OS in the logical temporal frame of reference. Note that object CO begins at logical time t=0 and ends at logical time t=120—object OD begins at logical time t=10 and ends at logical time t=100—object OS begins at logical time t=20 and ends at logical time t=80. It must be understood that the beginning or the ending of the dynamic monomedia object in fact corresponds to the beginning and the ending of the presentation of the audiovisual sequence. The beginning and the ending of the static monomedia object correspond to the beginning and the end of display of the text on the screen.

To coordinate these beginning and ending phases, even in the event of a change to the speed of presentation, it is necessary to lock the temporal behavior of the static monomedia object(s) like the object OS to the temporal behavior of the dynamic monomedia object(s) OD.

Accordingly, if the user requests a change to the speed of presentation of the multimedia document via one of the function keys 61 through 67, the synchronization data is processed to maintain consistency at the level of the presentation of the various components.

Figure 6:
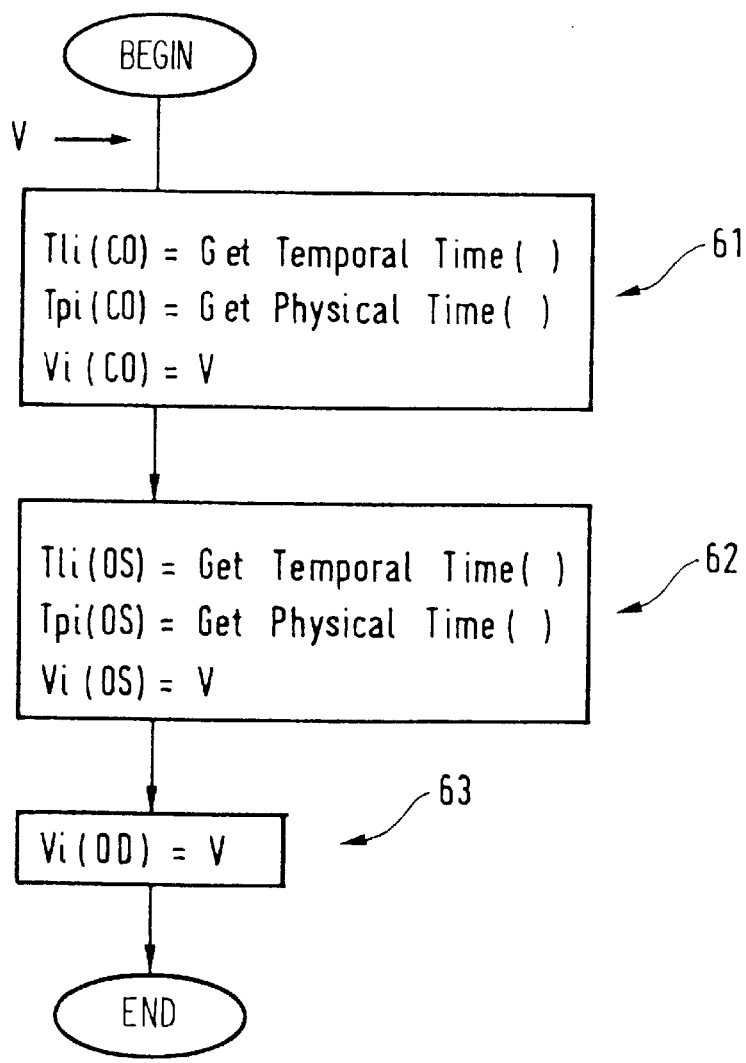
FIG. 6 is a flowchart of the processing carried out on the synchronization data.

For example, if at logical time Tl between 20 and 80 seconds shown in FIG. 5, i.e. when the audiovisual sequence AVS and the text TEXT are being presented at a certain speed, the user selects one of the keys for modifying the speed of presentation (key 63, for example), the multimedia engine applies the processing shown by the FIG. 6 flow-chart.

When the change speed of presentation to speed V event is processed, a first processing operation 61 is carried out on the attributes of the object CO to update Tli(CO).using an object-oriented method GetTemporalTime( ) which supplies the value of the current logical time Tl(CO), to update Tpi(CO) using an object method GetPhysicalTime( ) which supplies the current time given by the clock 7 and Vi(CO).

A second processing operation is carried out on the attributes of the object OS to update Tli(OS) using another object-oriented method GetTemporalTime( ) which supplies the value of the current logical time Tl(OS), to update Tpi(OS) using an object-oriented method GetPhysicalTime( ) which supplies the current time given by the clock 7 and Vi(OS).

For the objects CO and OS, the method GetTemporalPosition( ) returns a logical temporal position value based on the following equation:

$$Tl=Tli+(Tp-Tpi)\cdot Vi/VN$$

where Vi is the value of the speed of presentation on the last change of speed and VN is the value of the normal speed of presentation (25 images per second under European video standards). Note that the new current logical temporal position of the object CO or OS is equal to the logical temporal position of the object in question at the last change of speed plus the time period between the physical temporal position of the object in question at the last change of speed and the current physical temporal position given by the clock, this time period being additionally corrected by a multiplying factor (Vi/VN) allowing for the speed variation between these two physical times.

A third processing operation 63 is performed on the attributes of the object OD to update (Vi(OD) and to run a routine to command the change of reading speed at the reader of the medium 4.

For the object OD, the method GetTemporalPosition( ) returns a value on the basis of the following equation:

$$Tl=Tt-Ttb+Tlb$$

Note that here, for the object OD, the logical time is derived exclusively from the time code given that the latter already integrates the speed variations.

From these two equations respectively defining the logical time for a static object and the logical time for a dynamic object it is possible to coordinate (or synchronize) the presentation of the components of a static nature and the components of a dynamic nature of a multimedia document by assuring that:

$$Tl(CO)=Tl(OS)=Tl(OD).$$

Each subsequent reading of the logical time of an object by means of the method GetTemporalPosition( ) recovers a logical time Tl conforming to the current speed of presentation of the multimedia document, even if a change to the latter is requested by the system user.

Note that for the object OD the value of the current time code Tt is also recovered via an object-oriented method.

The various object-oriented methods referred to hereinabove are part of the multimedia software engine and can be implemented in the objects CO, OD and OS.

There is claimed:

1. A method of synchronizing the presentation of components of a dynamic nature and components of a static nature of an interactive multimedia document in a system for presentation of such documents, including the following steps:

representing said document and its dynamic and static components in said interactive multimedia document presentation system using an object-oriented model to define the interactive multimedia document in the form of a root multimedia object, each component of a dynamic nature of said document in the form of a dynamic monomedia object, and each component of a static nature of said document in the form of a static monomedia object, providing in said root multimedia object, and in each dynamic or static monomedia object synchronization data relating to times of presentation of said document in a logical temporal frame of reference for a certain speed of presentation of said multimedia document, said logical temporal frame of reference being derived from a coded temporal frame of reference supplied by a storage medium for components of a dynamic nature of said document, providing in said root multimedia object and in each static monomedia object synchronization data relating to a time of change of speed of presentation of said document in said logical temporal frame of reference, supplying in said root multimedia object and in each static monomedia object synchronization data relating to a time of presentation of said document in a physical temporal frame of reference supplied by a clock, supplying in said root multimedia object and in each static monomedia object synchronization data relating to a time of change of speed of presentation of said document in said physical temporal frame of reference, supplying in each dynamic monomedia object synchronization data relating to times of presentation of said document in said coded temporal frame of reference, and processing said synchronization data on each change of speed of presentation of said multimedia document to coordinate the presentation of said components of a dynamic nature and said components of a static nature thereof.

2. A method as claimed in claim 1, wherein said step of processing synchronization data includes determining a logical temporal position for said root object and each static object, by adding a logical temporal position of the object in question at a last change of speed and a physical temporal position amount equal to a change in physical temporal position since the last change in speed.

3. A method as claimed in claim 2, wherein said amount is additionally corrected by a multiplying factor allowing for speed variation.

4. A program product, for use with a computer system, providing synchronization of presentation of components of a dynamic nature and components of a static nature of an interactive multimedia document in a system for presentation of such documents, said multimedia system including a processor for processing said synchronization based on a change of speed of presentation of said components of a dynamic nature and said components of a static nature, said product comprising:

a root multimeadia object representing said document and said dynamic and static components in said interactive multimedia document presentation system using an object-oriented model to define the interactive multimedia document, said root object including:

synchronization data relating to times of presentation of said document in a logical temporal frame of reference for a certain speed of presentation of said multimedia document;

synchronization data relating to a time of change of speed of presentation of said document in said logical temporal frame of reference;

synchronization data relating to a time of presentation of said document in a physical temporal frame of reference supplied by a clock;

synchronization data relating to a time of change of speed of presentation of said document in said physical temporal frame of reference;

at least one dynamic monomedia object, representing a component of said interactive multimedia document of a dynamic nature, said dynamic object including:

synchronization data relating to times of presentation of said document in a logical temporal frame of reference for a certain speed of presentation of said multimedia document, said logical temporal frame of reference being derived from a coded temporal frame of reference supplied by a storage medium;

synchronization data relating to times of presentation of said document in said coded temporal frame of reference; and at least one static monomedia object, representing a component of said interactive multimedia document of a static nature, said static object including:

synchronization data relating to times of presentation of said document in a logical temporal frame of reference for a certain speed of presentation of said multimedia document;

synchronization data relating to a time of change of speed of presentation of said document in said logical temporal frame of reference;

synchronization data relating to a time of presentation of said document in a physical temporal frame of reference supplied by a clock; and synchronization data relating to a time of change of speed of presentation of said document in said physical temporal frame of reference.

* * * * *